United States Patent
Kwon et al.

(10) Patent No.: US 11,723,113 B2
(45) Date of Patent: Aug. 8, 2023

(54) APPARATUS AND METHOD FOR ENABLING AND DISABLING LINKS IN MULTI-LINK COMMUNICATION SYSTEMS

(71) Applicant: NXP USA, Inc., Austin, TX (US)

(72) Inventors: Young Hoon Kwon, Laguna Niguel, CA (US); Liwen Chu, San Ramon, CA (US); Hongyuan Zhang, Fremont, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 134 days.

(21) Appl. No.: 17/138,801

(22) Filed: Dec. 30, 2020

(65) Prior Publication Data

US 2021/0212156 A1 Jul. 8, 2021

Related U.S. Application Data

(60) Provisional application No. 62/980,175, filed on Feb. 22, 2020, provisional application No. 62/957,176, filed on Jan. 4, 2020.

(51) Int. Cl.
| | |
|---|---|
| *H04W 76/34* | (2018.01) |
| *H04W 88/06* | (2009.01) |
| *H04W 76/28* | (2018.01) |
| *H04W 76/38* | (2018.01) |
| *H04W 76/15* | (2018.01) |

(52) U.S. Cl.
CPC ........... *H04W 76/34* (2018.02); *H04W 76/15* (2018.02); *H04W 76/28* (2018.02); *H04W 76/38* (2018.02); *H04W 88/06* (2013.01)

(58) Field of Classification Search
CPC ..... H04W 76/34; H04W 76/15; H04W 76/28; H04W 76/38; H04W 88/06; H04W 76/11; H04W 76/27
See application file for complete search history.

(56) References Cited

U.S. PATENT DOCUMENTS

| | | | |
|---|---|---|---|
| 2020/0163141 A1* | 5/2020 | Hsu | H04W 36/28 |
| 2021/0315036 A1* | 10/2021 | Jang | H04L 1/1887 |
| 2022/0132423 A1* | 4/2022 | Fang | H04W 28/06 |
| 2022/0264429 A1* | 8/2022 | Gan | H04L 1/1614 |

(Continued)

OTHER PUBLICATIONS

IEEE; "IEEE P802.11ax™/D6.0 Draft Standard for Information technology—Telecommunications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN"; Nov. 2019; 780 pages.

(Continued)

*Primary Examiner* — Will W Lin

(57) ABSTRACT

Embodiments of an apparatus and method are disclosed. In an embodiment, a method of enabling and disabling of links in the system a multi-link communications system comprises receiving, by a first multi-link device in the multi-link communications system, a status change information of a link in the multi-link communications system for the first multi-link device from an enabled status to a disabled status, and in response to the status change information, at least partially resetting, by the first multi-link device, parameters related to per-link operations for the link.

18 Claims, 9 Drawing Sheets

```
RECEIVE, BY A FIRST MULTI-LINK DEVICE IN THE MULTI-LINK COMMUNICATIONS   902
SYSTEM, A STATUS CHANGE INFORMATION OF A LINK IN THE MULTI-LINK
COMMUNICATIONS SYSTEM FOR THE FIRST MULTI-LINK DEVICE FROM AN
ENABLED STATUS TO A DISABLED STATUS

IN RESPONSE TO THE STATUS CHANGE INFORMATION, AT LEAST PARTIALLY    904
RESET, BY THE FIRST MULTI-LINK DEVICE, PARAMETERS RELATED TO PER-LINK
OPERATIONS FOR THE LINK
```

(56) References Cited

U.S. PATENT DOCUMENTS

2022/0272777 A1* 8/2022 Guo .................. H04W 24/02
2022/0272783 A1* 8/2022 Yang ................. H04W 74/00
2022/0279375 A1* 9/2022 Kim .................. H04W 76/15

OTHER PUBLICATIONS

IEEE; "IEEE P802.11-REVmd™/D3.0, Draft Standard for Information technology Telecommunications and information exchange between systems Local and metropolitan area networks—Specific requirements; Part 11: Wireless LAN Medium Access Control (MAC) and Physical Layer (PHY) Specifications"; Oct. 2019; 4647 pages.

* cited by examiner

APPARATUS AND METHOD FOR ENABLING AND DISABLING LINKS IN MULTI-LINK COMMUNICATION SYSTEMS

CROSS-REFERENCE TO RELATED APPLICATIONS

This application is entitled to the benefit of U.S. Provisional Patent Application Ser. No. 62/957,176, filed on Jan. 4, 2020 and U.S. Provisional Patent Application Ser. No. 62/980,175, filed on Feb. 22, 2020, which are incorporated herein by reference.

BACKGROUND

In multi-link communications, communication links between access point (AP) multi-link devices (MLD) and non-AP MLD may be enabled and disabled by the AP MLD and/or the non-AP MLD. In some instances, a disabled communication link between an AP MLD and a non-AP MLD may be re-enabled. The process of enabling, disabling and/or re-enabling a communication link between an AP MLDs and a non-AP MLDs requires operations to be performed by the AP MLDs and the non-AP MLD, which need to be properly defined for efficient execution of the process.

SUMMARY

Embodiments of an apparatus and method are disclosed. In an embodiment, a method of enabling and disabling of links in the system a multi-link communications system comprises receiving, by a first multi-link device in the multi-link communications system, a status change information of a link in the multi-link communications system for the first multi-link device from an enabled status to a disabled status, and in response to the status change information, at least partially resetting, by the first multi-link device, parameters related to per-link operations for the link.

In an embodiment, wherein at least partially resetting, by the first multi-link device, the parameters related to per-link operations for the link includes resetting all the parameters related to the per-link operations for the link.

In an embodiment, wherein the parameters include operating modes on the link, enhanced distributed channel access function (EDCAF) values and states, parameters related to target wake time (TWT), or parameters related to association identifier (AID).

In an embodiment, wherein at least partially resetting, by the first multi-link device, the parameters related to per-link operations for the link includes tearing down TWT sessions that have been set up for the link.

In an embodiment, the method further comprises receiving, by the first multi-link device, another status change information of the link in the multi-link communications system for the first multi-link device from the disabled status to the enabled status, receiving, by the first multi-link device, a particular frame from a second multi-link device in the multi-link communications system that includes critical information to allow the first multi-link device to access the link in the enabled status, and after reception of the particular frame, accessing the link by the first multi-link device after receiving the particular frame from the second multi-link device.

In an embodiment, wherein the particular frame is a beacon frame or a probe response frame that includes capabilities or operating parameters of the second multi-link device on the link.

In an embodiment, the method further comprises receiving, by the first multi-link device, a frame from the second multi-link device that indicates a critical update has occurred on the link while the link was disabled.

In an embodiment, the method further comprises announcing, by a second multi-link device in the multi-link communications system, an upcoming disablement of the link using a frame with an information element that includes a temporal field indicating remaining time before the link will be disabled, and disabling the link, by the second multi-link device, after the remaining time indicated by the temporal field of the information element in the frame has elapsed.

In an embodiment, wherein the temporal field of the information element in the frame includes a countdown value or a time value that indicates the remaining time before the link will be disabled.

In an embodiment, wherein the frame with the information element is transmitted on the link or on another link associated with the second multi-link device.

In an embodiment, a multi-link communications system comprises a first multi-link device, a second multi-link device, and at least one link associated with the first and second multi-link devices. The first multi-link device comprises a processor configured to receive a status change information of a link in the multi-link communications system for the first multi-link device from an enabled status to a disabled status, and in response to the status change information, at least partially reset parameters related to per-link operations for the link such that at least one of the parameters related to the per-link operations for the link is maintained after the link is disabled.

In an embodiment, wherein the processor of the first multi-link device is configured to receive another status change information of the link in the multi-link communications system for the first multi-link device from the disabled status to the enabled status, receive a particular frame from the second multi-link device in the multi-link communications system that includes critical information to allow the first multi-link device to access the link in the enabled status, and access the link after receiving the particular frame from the second multi-link device.

In an embodiment, wherein the second multi-link device comprises a second processor configured to announce an upcoming disablement of the link using a frame with an information element that includes a temporal field indicating remaining time before the link will be disabled, and disable the link after the remaining time indicated by the temporal field of the information element in the frame has elapsed.

In an embodiment, wherein the temporal field of the information element in the frame includes a countdown value or a time value that indicates the remaining time before the link will be disabled.

In an embodiment, wherein the frame with the information element is transmitted on the link or on another link associated with the second multi-link device.

In an embodiment, a multi-link device of a multi-link communications system comprises a processor configured to receive a status change information of a link in the multi-link communications system for the multi-link device from an enabled status to a disabled status, and in response to the status change information, at least partially reset parameters related to per-link operations for the link.

In an embodiment, wherein the parameters include operating modes on the link, enhanced distributed channel access function (EDCAF) values and states, parameters related to target wake time (TWT), or parameters related to association identifier (AID).

In an embodiment, wherein the processor is configured to receive another status change information of the link in the multi-link communications system for the multi-link device from the disabled status to the enabled status, receive a particular frame from a second multi-link device in the multi-link communications system that includes critical information to allow the multi-link device to access the link in the enabled status, and access the link after receiving the particular frame from the second multi-link device.

In an embodiment, wherein the particular frame is a beacon frame or a probe response frame that includes capabilities or operating parameters of the second multi-link device on the link.

In an embodiment, wherein the processor is configured to receive a frame from the second multi-link device that indicates a critical update has occurred on the link while the link was disabled.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
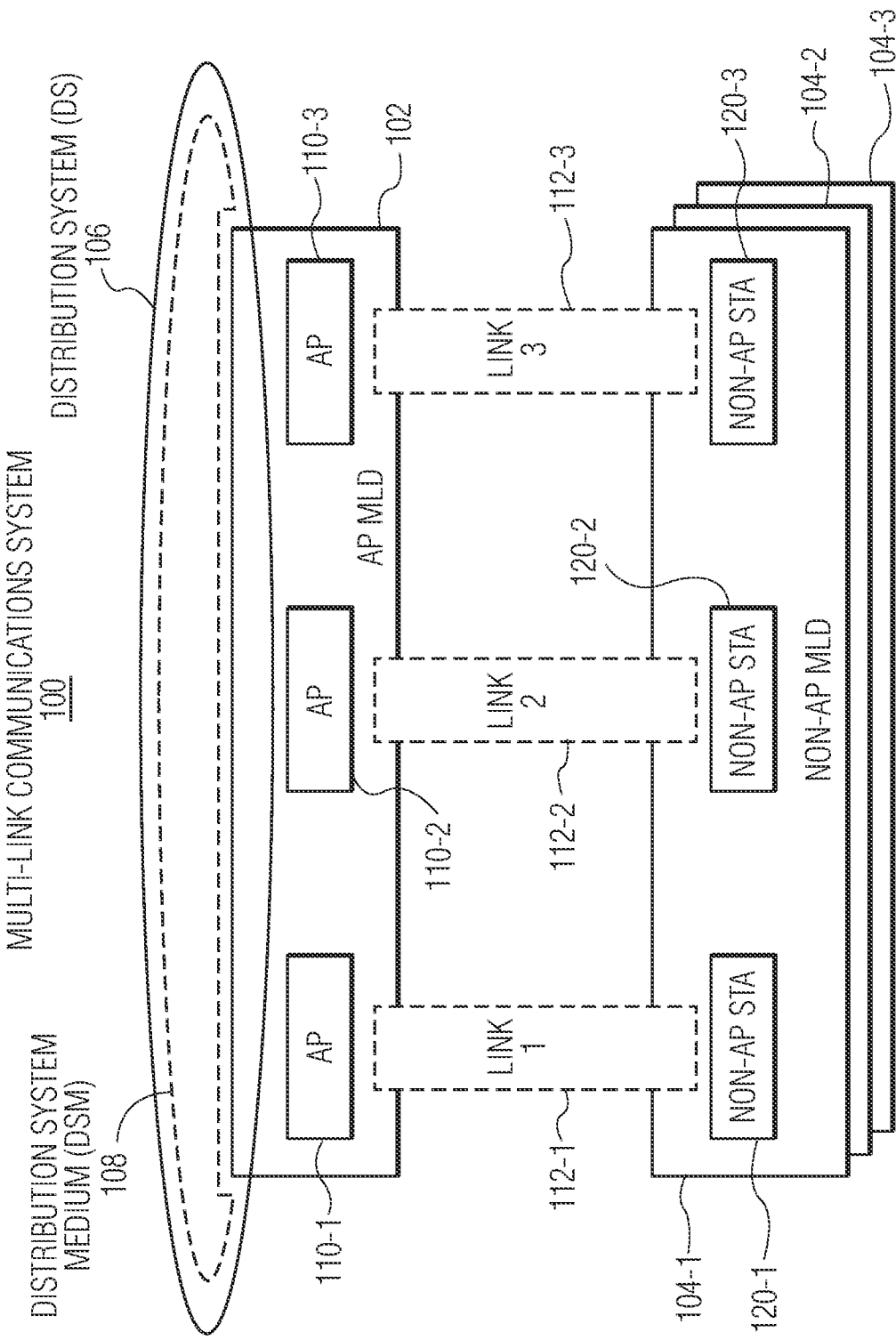
FIG. 1 depicts a multi-link communications system in accordance with an embodiment of the invention.

FIG. 1 depicts a multi-link communications system 100 in accordance with an embodiment of the invention. In the embodiment depicted in FIG. 1, the multi-link communications system includes at least one AP MLD 102, and multiple non-AP MLDs 104-1, 104-2, 104-3. The multi-link communications system can be used in various applications, such as industrial applications, medical applications, computer applications, and/or consumer or appliance applications. In some embodiments, the multi-link communications system is a wireless communications system, such as a wireless communications system compatible with an Institute of Electrical and Electronics Engineers (IEEE) 802.11 protocol. For example, the multi-link communications system may be a wireless communications system compatible with an IEEE 802.11be protocol. In some embodiments, the multi-link communications system includes one or more AP MLDs and/or one or more non-AP MLDs. Although the depicted multi-link communications system 100 is shown in FIG. 1 with certain components and described with certain functionality herein, other embodiments of the multi-link communications system 100 may include fewer or more components to implement the same, less, or more functionality. For example, in some embodiments, the multi-link communications system includes multiple AP MLDs, more than three non-AP MLDs, and/or less than three non-AP MLDs. In yet another example, although the multi-link communications system 100 is shown in FIG. 1 as being connected in a certain topology, the network topology of the multi-link communications system 100 is not limited to the topology shown in FIG. 1.

In the embodiment depicted in FIG. 1, the AP MLD 102 includes multiple APs 110-1, 110-2, 110-3. The APs 110-1, 110-2, 110-3 may be implemented in hardware (e.g., circuits), software, firmware, or a combination thereof. The APs 110-1, 110-2, 110-3 may be fully or partially implemented as an integrated circuit (IC) device. In some embodiments, the APs 110-1, 110-2, 110-3 are wireless APs compatible with at least one WLAN communications protocol (e.g., at least one IEEE 802.11 protocol). For example, the APs 110-1, 110-2, 110-3 may be wireless APs compatible with an IEEE 802.11be protocol. In some embodiments, an AP is a wireless AP that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, an AP includes at least one antenna, at least one transceiver operably connected to the at least one antenna, and at least one controller operably connected to the corresponding transceiver. In some embodiments, the least one transceiver includes a physical layer (PHY) device. The at least one controller operably may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. Each of the APs 110-1, 110-2, 110-3 of the AP MLD may operate in a different frequency band. For example, the AP 110-1 may operate in 2.4 gigahertz (GHz) frequency band, the AP 110-2 may operate in 5 GHz frequency band, and the AP 110-3 may operate in 6 GHz frequency band. In the embodiment depicted in FIG. 1, the AP MLD is connected to a distribution system (DS) 106 through a distribution system medium (DSM) 108. The distribution system (DS) 106 may be a wired network or a wireless network that is connected to a backbone network such as the Internet. The DSM 108 may be a wired medium (e.g., Ethernet cables, telephone network cables, or fiber optic cables) or a wireless medium (e.g., infrared, broadcast radio, cellular radio, or microwaves). Although the AP MLD 102 is shown in FIG. 1 as including three APs, other embodiments of the AP MLD 102 may include fewer than three APs or more than three APs. In addition, although some examples of the DSM 108 are described, the DSM 108 is not limited to the examples described herein.

In the embodiment depicted in FIG. 1, the non-AP MLD 104-1 includes multiple non-AP stations (STAs) 120-1, 120-2, 120-3. The STAs 120-1, 120-2, 120-3 may be implemented in hardware (e.g., circuits), software, firmware, or a combination thereof. The STAs 120-1, 120-2, 120-3 may be fully or partially implemented as an IC device. In some embodiments, the non-AP STAs 120-1, 120-2, 120-3 are wireless devices that wirelessly connect to wireless APs. For example, at least one of the non-AP STAs 120-1, 120-2, 120-3 may be a laptop, a desktop personal computer (PC), a mobile phone, or other wireless device that supports at least one WLAN communications protocol. In some embodiments, the non-AP STAs 120-1, 120-2, 120-3 are wireless devices compatible with at least one IEEE 802.11 protocol (e.g., an IEEE 802.11be protocol). In some embodiments, the non-AP MLD has one Media Access Control (MAC) data service interface. In an embodiment, a single address is associated with the MAC data service interface and is used to communicate on the DSM 108. In some embodiments, the AP MLD 102 and/or the non-AP MLDs 104-1, 104-2, 104-3 identify which communications links support the multi-link operation during a multi-link operation setup phase and/or exchanges information regarding multi-link capabilities during the multi-link operation setup phase. Each of the non-AP STAs 120-1, 120-2, 120-3 of the non-AP MLD may operate in a different frequency band. For example, the non-AP STA 120-1 may operate in 2.4 GHz frequency band, the non-AP STA 120-2 may operate in 5 GHz frequency band, and the non-AP STA 120-3 may operate in 6 GHz frequency band. Each of the non-AP MLDs 104-2, 104-3 may be the same as or similar to the non-AP MLD 104-1. For example, the non-AP MLD 104-2 or 104-3 includes multiple non-AP STAs. In some embodiments, each STA includes at least one antenna, at least one transceiver operably connected to the at least one antenna, and at least one controller connected to the corresponding transceiver. In some embodiments, the at least one transceiver includes a PHY device. The at least one controller operably may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the non-AP MLD 104-1, 104-2, or 104-3 communicates with the AP MLD 102 through multiple communications links 112-1, 112-2, 112-3. For example, each of the non-AP STAs 120-1, 120-2, 120-3 communicates with an AP 110-1, 110-2, or 110-3 through a corresponding communications link 112-1, 112-2, or 112-3. Although the non-AP MLD 104-1 is shown in FIG. 1 as including three non-AP STAs, other embodiments of the non-AP MLD 104-1 may include fewer than three non-AP STAs or more than three non-AP STAs. In addition, although the AP MLD 102 communicates (e.g., wirelessly communicates) with the non-AP MLDs 104-1, 104-2, 104-3 through multiple links 112-1, 112-2, 112-3, in other embodiments, the AP MLD 102 may communicate (e.g., wirelessly communicates) with the non-AP MLDs through more than three communications links or less three than communications links.

The links 112 in the multi-link communication system 100 may be enabled, disabled and re-enabled, as needed. Enablement and disablement of links may be initiated by the AP MLD 102 or a non-AP MLD 104. Various processes involving enablement, disablement and re-enablement of the links 112 in the multi-link communication system 100 are described below.

Figure 2:
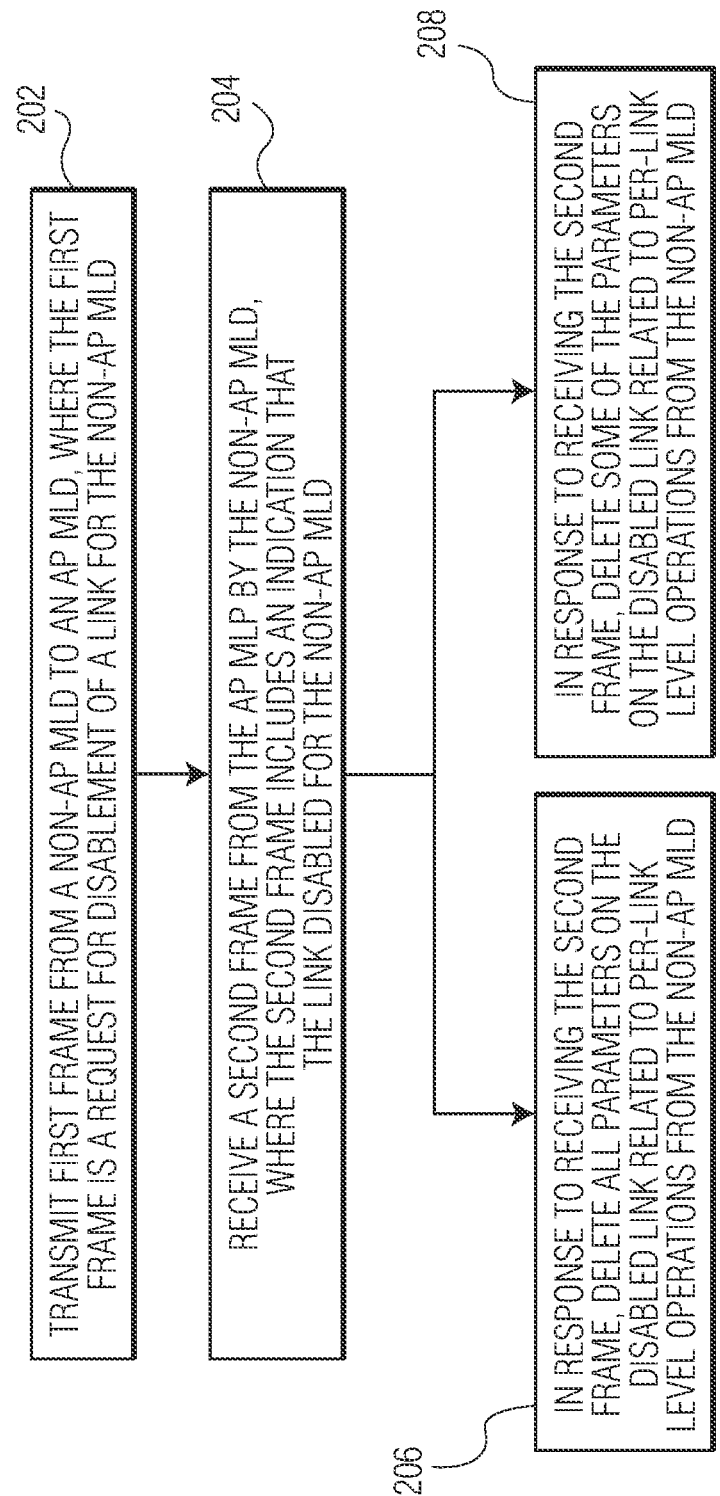
FIG. 2 is a flow diagram of a link disablement process for a non-AP MLD in the multi-link communication system in accordance with an embodiment of the invention.

A link disablement process for a non-AP MLD 104 in the multi-link communication system 100 in accordance with an embodiment of the invention is described with reference to a flow diagram of FIG. 2. In this description, it is assumed that the non-AP MLD involved in the link disablement process is the non-AP MLD 104-1 in the multi-link communication system 100. The link disablement process begins at step 202, where a first frame is transmitted from the non-AP MLD 104-1 to the AP MLD 102. The first frame is a request for disablement of a link 112, such as the link 112-1, for the non-AP MLD. Thus, the first frame includes request information for disablement of the link. Next, at step 204, a second frame from the AP MLD 102 is received by the non-AP MLD 104-1. The second frame includes an indication that the requested link 112-1 is disabled for the non-AP MLD 104-1.

In a first embodiment, in response to receiving the second frame, all parameters on the disabled link 112-1 related to per-link level operations are deleted from the non-AP MLD 104-1, at step 206. Thus, all configurations regarding the operation of the link 112-1 are removed from the non-AP MLD 104-1, such as power management state, enhanced distributed channel access function (EDCAF) parameters, operating modes, etc. Also, all setup target wake time (TWT) agreements and traffic indication map (TIM) broadcast are torn down, and all tunneled direct link setup (TDLS) agreements, fine time measurement (FTM) sessions, power save multi-poll (PSMP) sessions and flexible multi-cast service (FMS) agreements may be reset. In addition, all traffic related information on the link are removed, such as per-link transmit buffer, per-link scoreboard context, etc.

In this first embodiment, when the link 112-1 is re-enabled again, (1) all EDCAF states of the link are reset to initial values. In addition, the EDCA parameters are from the default values until the non-AP MLD 104-1 receives a frame including information on EDCA parameters to be used on the link from the AP MLD 102, such as EDCA Parameter Set element of the link. In addition, (2) exchange between the AP MLD 102 and the non-AP MLD 104-1 may be needed for capabilities and/or operating mode. Thus, capabilities and/or operating modes of the AP MLD on the link may be retrieved from a beacon frame on other links between the AP MLD and the non-AP MLD. Also, capabilities and/or operating modes of the non-AP MLD on the link may be reported to the AP MLD using frame exchange on another link between the AP MLD and the non-AP MLD. Furthermore, all operating modes of the link are reset to the initial values based on the exchanged information. Lastly, (3) if an association identifier (AID) was assigned to the non-AP MLD 104-1 per link, new AID is assigned to a non-AP STA that is affiliated with the non-AP MLD 104-1 and operating on the link 112-1. If the AID is not used by other STAs on the link, the new AID can be the same with the old AID that was assigned to the non-AP MLD.

In a second embodiment, in response to receiving the second frame, some of the parameters on the disabled link 112-1 related to per-link level operations are deleted for the non-AP MLD 104-1, at step 208. In this embodiment, some of the per-link level operation parameters/states are maintained and not removed from the non-AP MLD and the same parameters/states are reused when the link 112-1 is enabled later.

In the second embodiment, there are different options for the operating modes on the link 112-1. In a first option, all operating modes on the link 112-1 for the non-AP MLD 104-1 are reset. For this option, when the link is enabled again, the operating modes of the link are based on information included in a beacon frame of the AP-MLD 102 on the link until the non-AP MLD receives a frame initiating a change of operating mode, such as operating mode notification by a management frame or the operating mode indication procedure by an A-Control subfield.

In a second option for the operating modes on the link 112-1, current operating modes on the link are maintained for the non-AP MLD 104-1. For this option, when the link is enabled again, the operating modes of the link are based on the operating modes that the non-AP MLD was using when the link was disabled.

In a third option for the operating modes on the link 112-1, dynamic operating mode update based on A-Control subfield information on the link is reset for the non-AP MLD 104-1. For this option, when the link is enabled again, the operating modes of the link are based on the most recently updated operating mode by operating mode notification by a management frame, if there was an update made by operating mode notification. If there was no update made by operating mode notification, the operating modes are based on the information included in a beacon frame of the AP-MLD 102 on the link 112-1.

In the second embodiment, there are also different options for EDCAF values and states for the non-AP MLD 104-1. In a first option, for the disabled link 112-1, all EDCAF states are reset and EDCA parameters are reset to initial values for the non-AP MLD. For this option, when the link is enabled again, EDCAF states are reset to initial values. In addition, when the link is enabled again, the EDCA parameters are from the default values until the non-AP MLD 104-1 receives a frame including information on EDCA parameters to be used on the link 112-1 from the AP MLD 102, such as EDCA Parameter Set element of the link.

In a second option for the EDCAF values and states, for the disabled link 112-1, all EDCAF states are reset and previous EDCA parameters are reused for the non-AP MLD. For this option, when the link is enabled again, the EDCAF states are reset to initial values. In addition, when the link is enabled again, the EDCA parameters are from the values that the non-AP MLD used on the link when the link was disabled.

In a third option for the EDCAF values and states, for the disabled link 112-1, all EDCAF states and parameters are reused for the non-AP MLD 104-1. For this option, when the link is enabled again, the EDCAF states and parameters are from the values that the non-AP MLD used on the link when the link was disabled.

In the second embodiment, there are also different options for TWT for the non-AP MLD 104-1. In a first option, all setup TWT agreements on the disabled link 112-1 are torn down. For this option, when the link is enabled again, new TWT setup is required to be used. However, if a TWT agreement comprises more than one link and the disabled link is a part of the TWT agreement, this TWT element may not be torn down. In this case, the TWT agreement may be updated such that the same TWT agreement is maintained except that the updated TWT agreement does not include TWT operation on the disabled link.

In a second option for TWT, all setup TWT sessions on the disabled link 112-1 are suspended while the link 112-1 is disabled. For this option, when the link is enabled again, the suspended TWT session can be resumed.

In the second embodiment, there are also different options for AID for the non-AP MLD. In a first option, the AID of the non-AP MLD 104-1 on the link 112-1 is released. For this option, when the link is enabled again, new AID is assigned to the non-AP MLD on the link. If the AID is not used by other STAs on the link, the new AID can be the same as the old AID that was assigned to the non-AP MLD.

In a second option for AID, the AID of the non-AP MLD 104-1 on the link is maintained. For this option, when the link is enabled again, the same AID is reused for the non-AP MLD on the link.

In the second embodiment, power management state on the link 112-1 for the non-AP MLD 104-1 may be removed. Also, active TIM broadcast for the non-AP MLD on the link may be terminated. In addition, all TDLS agreements, FTM sessions, PSMP sessions, FMS agreements may also be reset. Furthermore, all traffic related information may be removed, such as per-link transmit buffer, per-link scoreboard context, etc.

When a link is disabled for a non-AP MLD, the non-AP MLD may stop PHY/MAC operation on the link for power save purpose. The non-AP MLD may not check management frames on the disabled link. Even if the information on the management frames on the disabled link is broadcasted on other link, the non-AP MLD may not check the information because that information is not useful for the non-AP MLD.

If critical update occurred during the time the link is disabled for the non-AP MLD and if the non-AP MLD accesses the link without knowing the critical update, the non-AP MLD may not successfully exchange frames or the non-AP MLD may violate the access rules set by the AP MLD. Thus, it is better for the non-AP MLD to check information of a beacon frame on the link before accessing the link, which may be delivered on other links. If critical update did not occur during the time the link is disabled for the non-AP MLD, the non-AP MLD may access the link whenever the non-AP MLD ready after the link is enabled.

Figure 3:
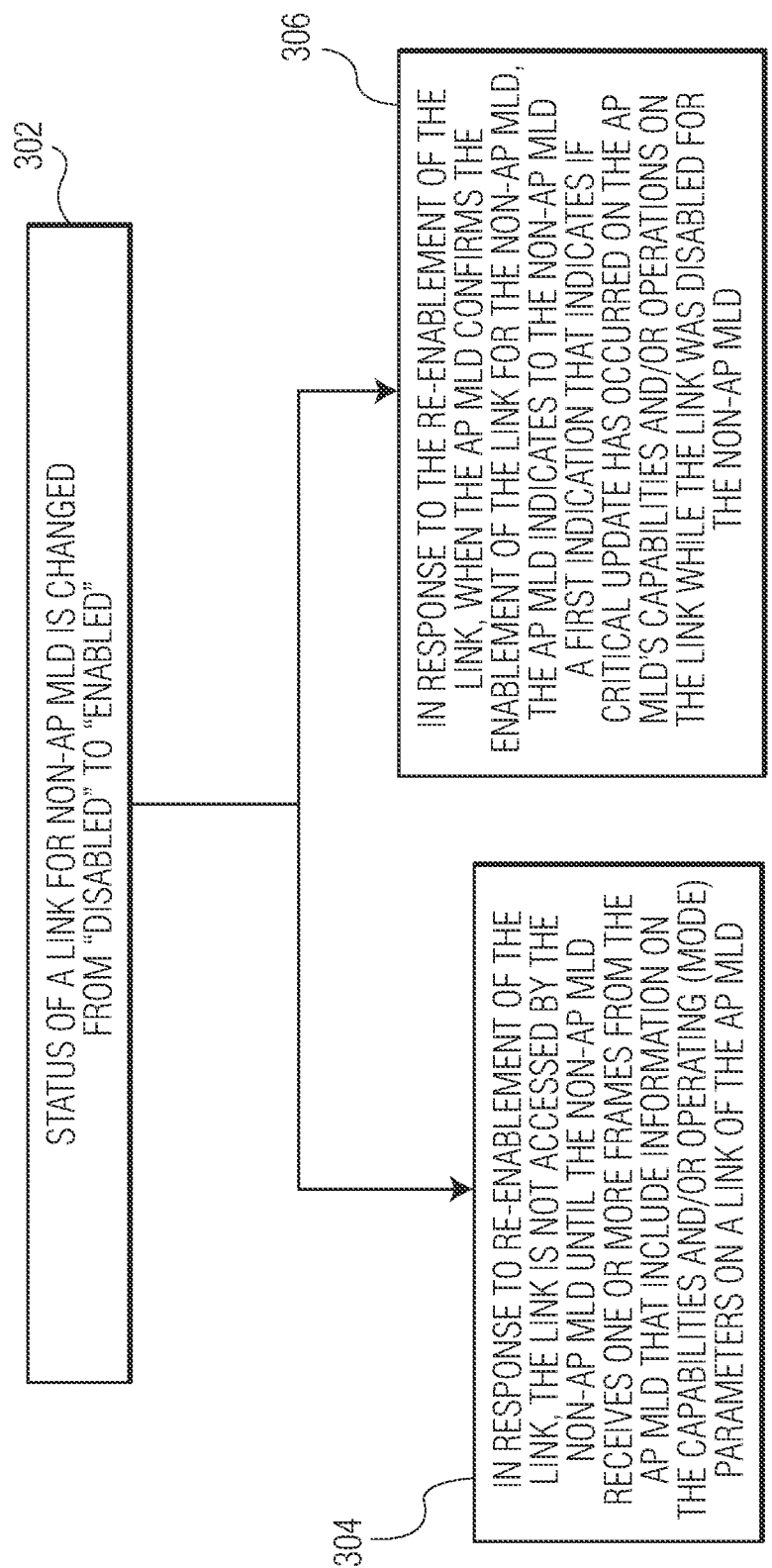
FIG. 3 is a flow diagram of a link re-enablement process for a non-AP MLD in the multi-link communication system in accordance with an embodiment of the invention.

A link re-enablement process for a non-AP MLD 104 in the multi-link communication system 100 in accordance with an embodiment of the invention is described with reference to a flow diagram of FIG. 3. In this description, it is assumed that the non-AP MLD involved in the link re-enablement process is the non-AP MLD 104-1 in the multi-link communication system 100. The link re-enablement process begins at step 302, where the status of a link 112, such as the link 112-1, for the non-AP MLD is changed from "disabled" to "enabled". Thus, the link 112-1 for the non-AP MLD 104-1 has been re-enabled. In an embodiment, the link is re-enabled by the AP MLD 102.

In a first embodiment, at step 304, in response to the re-enablement of the link 112-1, the link is not accessed by the non-AP MLD 104-1 until the non-AP MLD receives one or more frames from the AP MLD 102 that include information on the capabilities and/or operating (mode) parameters on a link of the AP MLD. The one or more frames may be a probe response frame and/or a beacon frame. In some cases, the non-AP MLD may transmit a probe request frame to the AP MLD on the link 112-1 or another link to solicit a probe response frame from the AP MLD, wherein the probe response frame includes information on the capabilities and/or operating parameters of the link of the AP MLD. The one or more frames may be transmitted on the link 112-1. The one or more frames may be transmitted by an AP affiliated with the AP MLD 102, such as the AP 110-3, on another link, such as the link 112-3.

One example of this first embodiment is that the non-AP MLD will not operate on the link until it retrieved the most recent parameters for an AP (AP 1), such as the AP 110-1, operating on the link. In one implementation, a non-AP STA, such as the non-AP STA 120-1, may determine that it does not have the most recent parameters by receiving a change sequence for the AP1 that is different than the change sequence it stored for the AP 1. In another implementation, the non-AP STA may retrieve the most recent parameters by receiving a beacon or probe response frame from the AP 1 or another AP (AP 2), such as the AP 110-2, that is affiliated with the same AP MLD 102 with the AP 1. In this implementation, the non-AP STA may send a probe request frame to the AP 1. In this implementation, another non-AP STA, such as 120-2, of the same non-AP MLD 104-1 may send a multi-link probe request to another AP (other than the AP 1) of the AP MLD.

The one or more frames may be transmitted before the status of the link 112-1 for the non-AP MLD 104-1 is changed from "disabled" to "enabled". One example is the most recent transmission of a beacon frame, which may be transmitted by the AP MLD 102 on another link, such as the link 112-3, that includes information of the capabilities and/or operating (mode) parameters on the link 112-1 before accessing the link. Another example is that, while the link is in "disabled" state, the non-AP MLD turns on and monitors the disabled link to receive the one or more frames.

The one or more frames may contain some information elements such as (but not limited to) Channel Switch Announcement element, Extended Channel Switch Announcement element, EDCA parameters element, Quiet element, Direct Sequence Spread Spectrum (DSSS) Parameter Set element, High Throughput (HT) Operation element, Wide Bandwidth Channel Switch element, Channel Switch Wrapper element, Operating Mode Notification element, Quiet Channel element, Very High Throughput (VHT) Operation element, High Efficiency (HE) Operation element, Broadcast TWT element, Basic Service Set (BSS) Color Change Announcement element, Multi-User (MU) EDCA Parameter Set element, Spatial Reuse Parameter Set element, and Extremely High Throughput (EHT) Operation element.

In a second embodiment, at step 306, in response to the re-enablement of the link 112-1, when the AP MLD 102 confirms the enablement of the link for the non-AP MLD 104-1, the AP MLD indicates to the non-AP MLD a first indication that indicates if critical update has occurred on capabilities and/or operation of the AP MLD on the link while the link was disabled for the non-AP MLD. If the first indication indicates that critical update has not occurred, the non-AP MLD accesses the link whenever the non-AP MLD is ready after the link is enabled.

If the first indication indicates that critical update has occurred, the non-AP MLD 104-1 accesses the link 112-1 after the non-AP MLD receives a particular frame that indicates the most recent information on the AP MLD's capabilities and/or operation of the link. The particular frame may be a probe response frame or a beacon frame. This frame may be transmitted on the link 112-1. Alternatively, the frame may be transmitted by an AP affiliated with the AP MLD 104 on another link, such as the AP 110-3 on the link 112-3.

In an embodiment, the first indication may be a check beacon flag in a beacon frame or a probe response frame, which may be 1 bit flag, where 0 implies that there has been no critical update and 1 implies that there has been critical update. In another embodiment, the first indication may be a beacon status counter in a beacon frame or a probe response frame, where the beacon status counter increases by one, each time critical update happens. In this second embodiment, the non-AP MLD 104-1 records the beacon status counter value (C1) when the link 112-1 is disabled, and when the link is enabled again, the non-AP MLD compares the current beacon status counter at this time with the recorded beacon status counter value (C1).

Critical update may imply that a modification/inclusion/insertion in a first group of the elements inside the beacon frame. Some example elements within the first group of elements may be Channel Switch Announcement element, Extended Channel Switch Announcement element, EDCA parameters element, Quiet element, DSSS Parameter Set element, HT Operation element, Wide Bandwidth Channel Switch element, Channel Switch Wrapper element, Operating Mode Notification element, Quiet Channel element, VHT Operation element, HE Operation element, Broadcast TWT element, BSS Color Change Announcement element, MU EDCA Parameter Set element, Spatial Reuse Parameter Set element, and EHT Operation element.

As noted above, the process of disabling a link 112 in the multi-link communication system 100 may be initiated by the AP MLD 102 or a non-AP MLD 104. If a link disablement is initiated by a non-AP MLD, the non-AP MLD will request for disabling of a link to the serving AP MLD, i.e., the AP MLD 104. After possible negotiation, the AP MLD will respond back to the non-AP MLD. The non-AP MLD and the AP MLD can both disable the link after the response from the AP MLD.

However, if a link disablement is initiated by the AP MLD 102, the process is dependent on the type of link disablement. There are two different types of link disablement: link disablement for a specific non-AP MLD and link disablement for all non-AP MLDs associated with the AP MLD. For link disablement for a specific non-AP MLD, the link disablement process may be similar to the link disablement process initiated by a non-AP MLD, as described above. However, for link disablement for all non-AP MLDs associated with the AP MLD, the link disablement process will differ, as described below.

Figure 4:
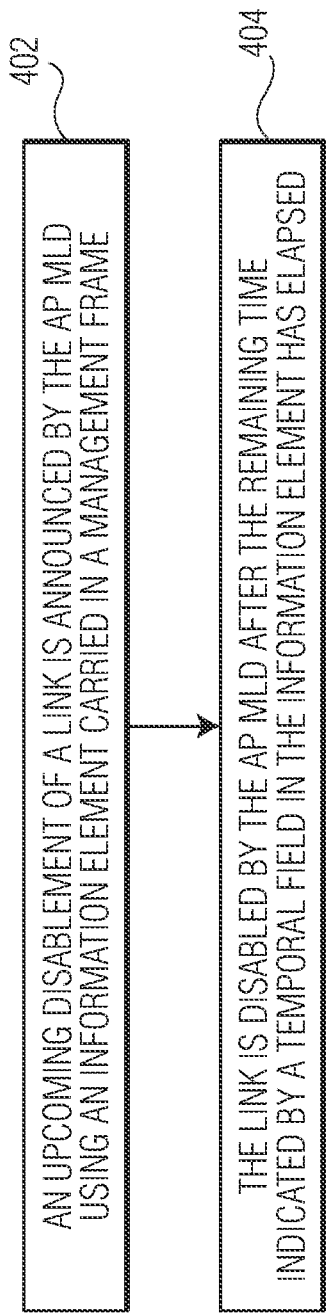
FIG. 4 is a flow diagram of a link disablement process initiated by an AP MLD for all non-AP MLDs associated with the AP MLD in the multi-link communication system in accordance with an embodiment of the invention.

A link disablement process initiated by the AP MLD 102 for all non-AP MLDs 104 associated with the AP MLD in the multi-link communication system 100 in accordance with an embodiment of the invention is described with reference to a flow diagram of FIG. 4. The link disablement process begins at step 402, where an upcoming disablement of a link, such as the link 112-1, is announced by the AP MLD 102 using an information element carried in a management frame. In this embodiment, an AP 110 affiliated with the AP MLD 102, such as the AP 110-1, may be operating on the link. The information element carried in the management frame may include a temporal field indicating information on the remaining time to the disablement of the link. The AP MLD may repeatedly announce the upcoming disablement of the first link for a period of time. Next, at step 404, the first link is disabled by the AP MLD 102 after the remaining time indicated by the temporal field of the information element carried in a management frame has elapsed.

The management frame may be a beacon frame, a probe response frame, a (re)association response frame, or a new frame intended to indicate the link disablement. The management frame may be transmitted on one or more links 112 that the AP-MLD 104 operates. The management frame may be transmitted on the link being disabled or on another link that is different from the link being disabled. In an embodiment, the management frame may be transmitted on all active/enabled links that the AP MLD operates.

The period of time for disablement announcement may be sufficiently long for all non-AP MLDs 104 associated with the AP MLD 102 to have an opportunity to receive at least one frame carrying the information element before the disablement of the link. In an embodiment, the AP MLD may transmit the information element more than once, wherein the remaining time indicated by the temporal field of the information element in different occasion indicating the same time that the disablement of the link is expected.

In an embodiment, the information on the remaining time may be expressed as an integer multiple of a beacon interval with or without an offset. This may be a counter value indicating the number of beacon interval until the link disablement time. If the management frame is transmitted on another link (link 2) that is different from the link being disabled (link 1), the counter value may indicate the remaining number of beacon intervals of link 2 using the beacon interval time of link 2 or may indicate the remaining number of beacon intervals of link 1 using the beacon interval time of link 1.

In another embodiment, the information on the remaining time is expressed as difference between time synchronization function (TSF) value of the time when the management frame is transmitted and the expected TSF value of the time when the disablement of the link will happen.

In still another embodiments, the information on the remaining time indicates information on the expected TSF value of the time when the disablement of the link will happen. If the management frame is transmitted on another link (link 2) that is different from the link being disabled (link 1), the expected TSF value of link 1 or the expected TSF value of link 2 may be used to indicate the remining time when the disablement of link 1 will happen.

In an embodiment, the disablement of the link occurs after transmission of a beacon frame on the link being disabled, wherein the beacon frame carries an element with information on the remaining time that is zero.

In a first embodiment, the temporal field in the information element indicates a countdown value. In one implementation, the countdown value in the information element is carried in a beacon frame on the link being disabled, e.g., the link 112-1, which is referred to herein as the first link. In this implementation, if the countdown value in the information element carried in a beacon frame on the first link has a value greater than zero (0), then at the next target beacon transit time (TBTT) on the first link, the AP MLD 102 decrements the countdown value in the information element carried in the beacon frame by one (1) until it reaches zero (0). The disablement of the link happens at a first TBTT at which the countdown value has decremented to zero (0). Alternatively, the disablement of the first link happens at a predetermined time after the first TBTT at which the first countdown value has decremented to zero (0). In some embodiments, the AP MLD may not alter the first TBTT after the AP MLD has announced a pending disablement of the first link.

Figure 5:
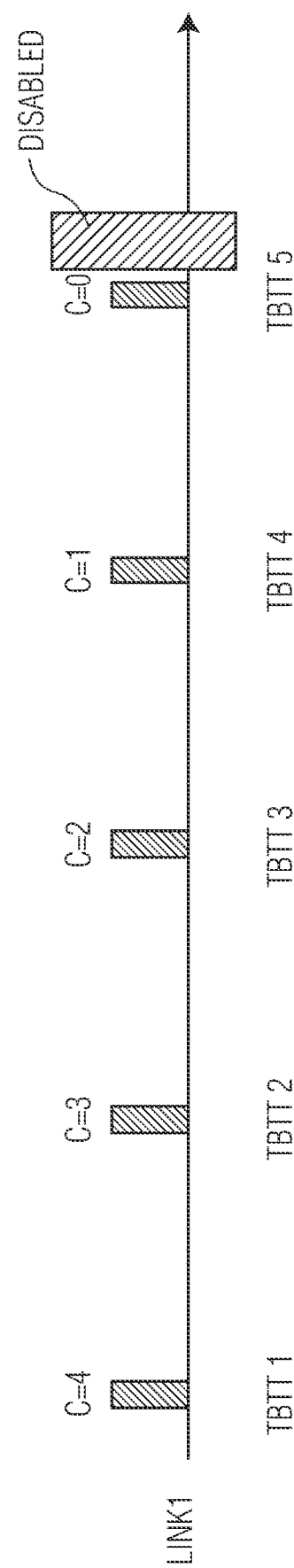
FIG. 5 illustrates a link disablement process using a countdown value in a frame transmitted on a link being disabled in accordance with an embodiment of the invention.

This first embodiment is illustrated in FIG. 5, which shows beacon frames on the link being disabled (Link 1) at different TBTTs. As shown in FIG. 5, the beacon frame at TBTT 1 carries an information element with a countdown value C of four (4). This countdown value is decreased by one (1) for each of the beacon frames at subsequent TBTTs. Thus, countdown values for the beacon frames at TBTT 2, TBTT 3, TBTT 4 and TBTT 5 are three (3), two (2), one (1) and zero (0), respectively. Since, at TBTT 5, the countdown value is zero (0), the disablement of Link 1 occurs after receiving the beacon frame at TBTT 5.

In a second embodiment, the management frame is transmitted on a second link, e.g., the link 112-2, which is a different link from the first link being disabled, wherein there is a second AP, e.g., the AP 110-2, affiliated with the AP MLD 102 operating on the second link. In this embodiment, the temporal field in the information element carried in the management frame on the second link indicates the countdown value. In one implementation, the countdown value in the information element is carried in a beacon frame on the second link. In this implementation, if the countdown value in the information element carried in the beacon frame on the second link has a value greater than zero (0), then at next TBTT on the second link, the AP MLD decrements the countdown value in the information element carried in beacon frame by one (1) until it reaches zero (0). The disablement of the first link, i.e., the link being disabled, happens at a second TBTT on the first link, wherein the second TBTT is the earliest TBTT on the first link after the countdown value has decremented to zero (0). In another embodiment, the disablement of the first link happens at a predetermined time after the second TBTT on the first link. In still another embodiment, the disablement of the first link happens at the next TBTT after the countdown value has reached zero (0). In some embodiments, the AP MLD may not alter the second TBTT after the AP MLD has announced a pending disablement of the link.

Figure 6:
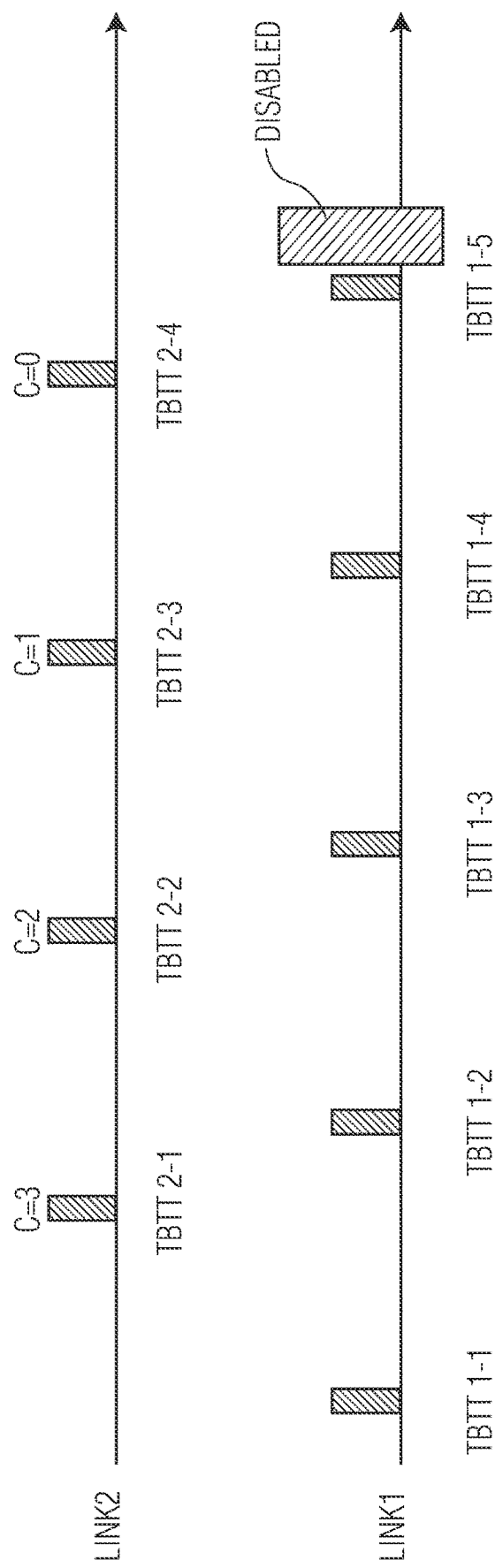
FIG. 6 illustrates a link disablement process using a countdown value in a frame transmitted on a link other than a link being disabled in accordance with an embodiment of the invention.

This second embodiment is illustrated in FIG. 6, which shows beacon frames on the first link being disabled (Link 1) at different TBTTs and beacon frames on a second link (Link 2) at different TBTTs. As shown in FIG. 6, the beacon frame at TBTT 2-1 on Link 2 carries an information element with a countdown value C of three (3). This countdown value is decreased by one (1) for each of the beacon frames at subsequent TBTTs on Link 2. Thus, countdown values for the beacon frames at TBTT 2-2, TBTT 2-3 and TBTT 2-4 on Link 2 are two (2), one (1) and zero (0), respectively. Since, at TBTT 2-4, the countdown value is zero (0), the disablement of the first link occurs after receiving the beacon frame at the next TBTT on Link 1 after TBTT 2-4. As shown in FIG. 6, there are beacon frames at TBTT 1-1, TBTT 1-2, TBTT 1-3, TBTT 1-4, TBTT 1-5 on Link 1. Since the next TBTT on Link 1 after TBTT 2-4 on Link 2 is TBTT 1-5, the disablement of Link 1 occurs after receiving the beacon frame at TBTT 1-5 on Link 1.

In a third embodiment, the temporal field in the information element indicates a time value. In one implementation, the time value in the information element is carried in a beacon frame on the first link being disabled. In this implementation, if the time value in the information element carried in a beacon frame on the first link has a value greater than zero (0), then at the next target beacon transit time (TBTT) on the first link, the AP MLD 102 decrements the time value in the information element carried in the beacon frame by the time difference between the beacon frames until it reaches a target value, which can be any value, including zero (0). In one embodiment, the target value is less than the beacon interval on the first link. The disablement of the first link happens at a TBTT at which the time value has decremented to the target value or less. Alternatively, the disablement of the first link happens at a predetermined time after the TBTT at which the time value has decremented to the target value or less. In some embodiments, the AP MLD may not alter the target TBTT after the AP MLD has announced a pending disablement of the first link.

Figure 7:
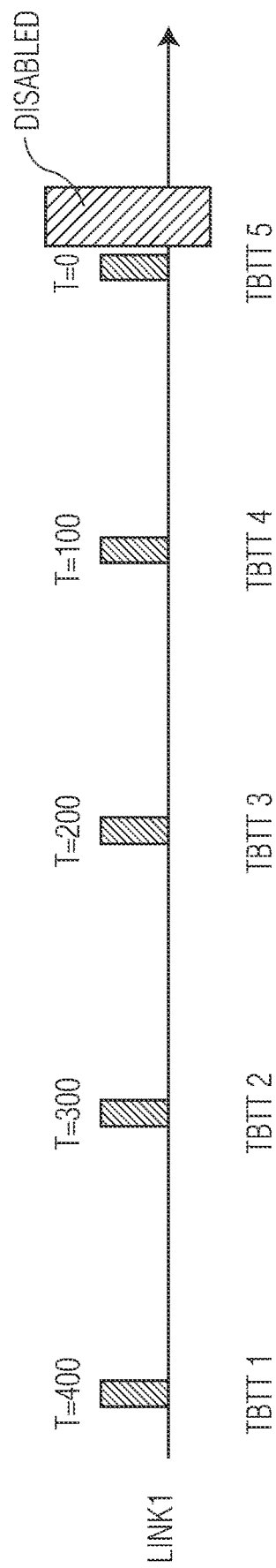
FIG. 7 illustrates a link disablement process using a time value in a frame transmitted on a link being disabled in accordance with an embodiment of the invention.

This third embodiment is illustrated in FIG. 7, which shows beacon frames on the first link (Link 1) at different TBTTs. As shown in FIG. 7, the beacon frame at TBTT 1 carries an information element with a time value T of four hundred (400). This time value is decreased by the time difference between beacon frames, which in this example is one hundred (100), for each of the beacon frames at subsequent TBTTs. Thus, time values for the beacon frames at TBTT 2, TBTT 3, TBTT 4 and TBTT 5 are three hundred (300), two hundred (200), one hundred (100) and zero (0), respectively. Since, at TBTT 5, the time value is zero (0), the disablement of Link 1 occurs after receiving the beacon frame at TBTT 5.

In a fourth embodiment, the management frame is transmitted on a second link, e.g., the link 112-2, which is a different link from the first link being disabled, wherein there is a second AP, e.g., the AP 110-2, affiliated with the AP MLD 102 operating on the second link. The temporal field in the information element carried in the management frame on the second link indicates the time value. In one implementation, the time value in the information element is carried in a beacon frame on the second link. In this implementation, if the time value in the information element carried in the beacon frame on the second link has a value greater than zero (0), then at the next TBTT on the second link the AP MLD decrements the time value in the information element carried in the beacon frame by the time difference between the beacon frames until it reaches a target value, which can be any value, including zero (0). In one embodiment, the target value is less than the beacon interval on the first link. The disablement of the first link happens at a target TBTT on the first link. In one embodiment, the target TBTT is the earliest TBTT on the first link at a predetermined time after the time value has decremented to or less than the target value. In another embodiment, the target TBTT is the earliest TBTT on the first link after the TBTT on the second link that carries the time value that reaches the target value. In some embodiments, the AP MLD may not alter the second TBTT after the AP MLD has announced a pending disablement of the first link.

Figure 8:
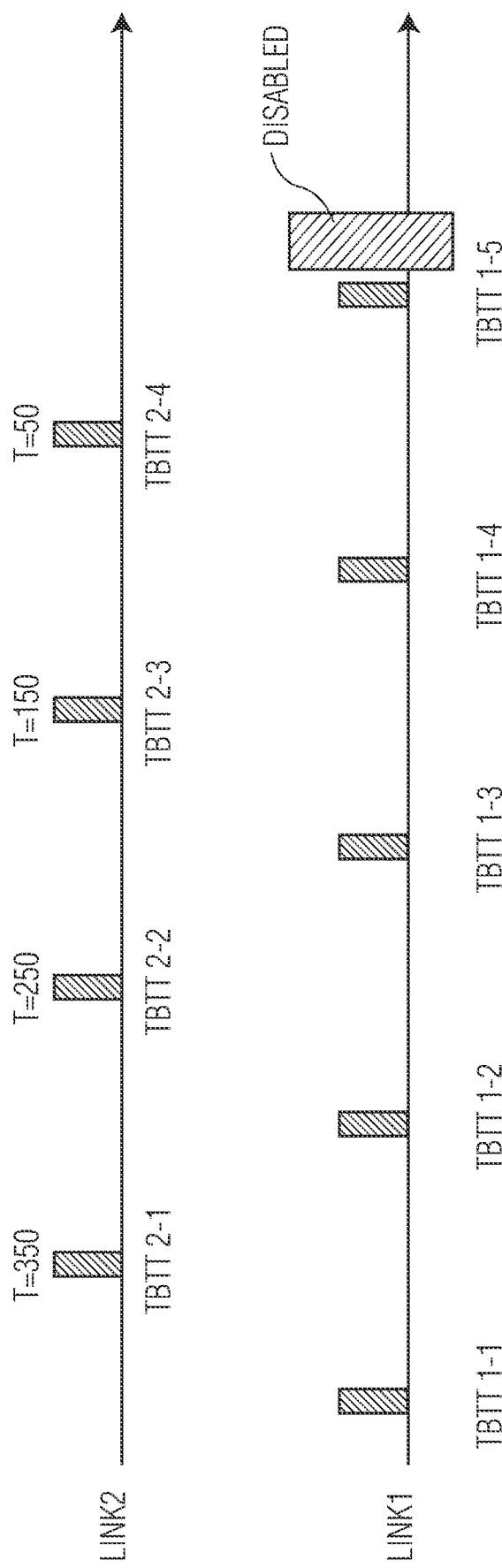
FIG. 8 illustrates a link disablement process using a time value in a frame transmitted on a link other than a link being disabled in accordance with an embodiment of the invention.

This fourth embodiment is illustrated in FIG. 8, which shows beacon frames on a first link (Link 1) at different TBTTs and beacon frames on a second link (Link 2) at different TBTTs. As shown in FIG. 8, the beacon frame at TBTT 2-1 on Link 2 carries an information element with a time value T of three hundred fifty (350). This time value is decreased by the time difference between beacon frames, which in this example is one hundred (100), for each of the beacon frames at subsequent TBTTs. Thus, time values for the beacon frames at TBTT 2-2, TBTT 2-3 and TBTT 2-4 on Link 2 are two hundred fifty (250), one hundred fifty (150) and fifty (50), respectively. It is assumed here that the target value is seventy-five (75). Since, at TBTT 2-4, the countdown value is fifty (50), which is less than the target value of seventy-five (75), the disablement of the first link occurs after receiving the beacon frame at the next TBTT on Link 1 after TBTT 2-4. As shown in FIG. 8, there are beacon frames at TBTT 1-1, TBTT 1-2, TBTT 1-3, TBTT 1-4, TBTT 1-5. Since the next TBTT on Link 1 after TBTT 2-4 on Link 2 is TBTT 1-5, the disablement of Link 1 occurs after receiving the beacon frame at TBTT 1-5.

Figure 9:
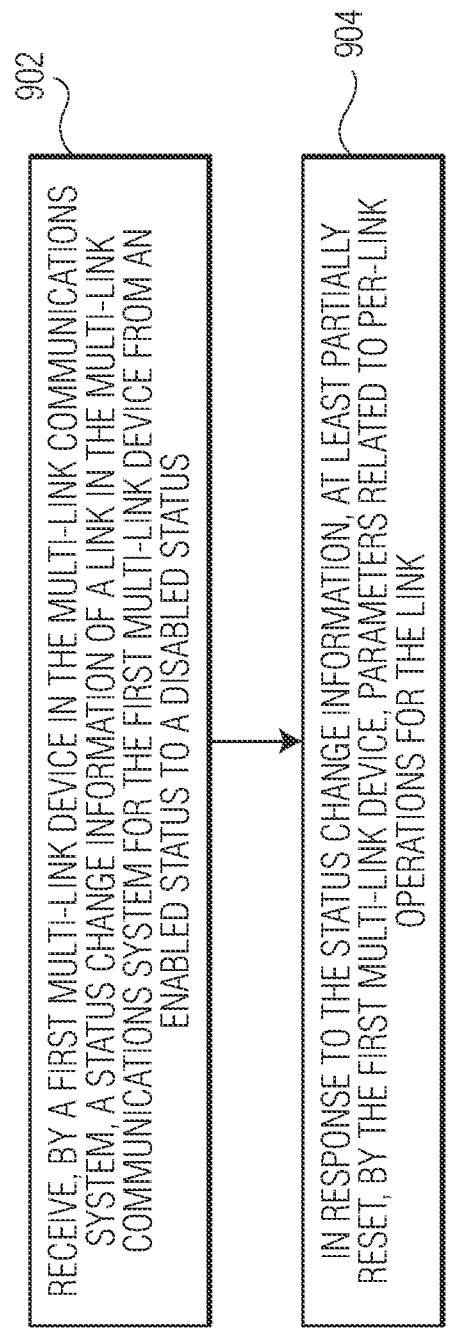
FIG. 9 illustrates a flow diagram of a method of enabling and disabling of links in a multi-link communications system in accordance with an embodiment of the invention.

A method of enabling and disabling of links in a multi-link communications system in accordance with an embodiment of the invention is described with reference to a flow diagram of FIG. 9. At block 902, a status change information of a link in the multi-link communications system for a first multi-link device in the multi-link communications system from an enabled status to a disabled status is received by the first multi-link device. At block 904, in response to the status change information, parameters related to per-link operations for the link are at least partially reset by the first multi-link device. In some embodiments, all the parameters related to per-link operations for the link are reset by the first multi-link device. In other embodiments, only some of the parameters related to the per-link operations for the link are reset by the first multi-link device such that at least one parameter related to the per-link operations for the link is maintained after the link is disabled.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of enabling and disabling of links in a multi-link communications system, the method comprising:
   receiving, by a first multi-link device in the multi-link communications system, a status change information of a link in the multi-link communications system for the first multi-link device from an enabled status to a disabled status;
   in response to the status change information, at least partially resetting, by the first multi-link device, parameters related to per-link operations for the link;
   announcing, by a second multi-link device in the multi-link communications system, an upcoming disablement of the link using a frame with an information element that includes a temporal field indicating remaining time before the link will be disabled; and
   disabling the link, by the second multi-link device, after the remaining time indicated by the temporal field of the information element in the frame has elapsed.

2. The method of claim 1,
   wherein at least partially resetting, by the first multi-link device, the parameters related to per-link operations for the link includes resetting all the parameters related to the per-link operations for the link.

3. The method of claim 1,
   wherein the parameters include operating modes on the link, enhanced distributed channel access function (EDCAF) values and states, parameters related to target wake time (TWT), or parameters related to association identifier (AID).

4. The method of claim 2,
   wherein at least partially resetting, by the first multi-link device, the parameters related to per-link operations for the link includes tearing down a target wake time (TWT) session that has been set up for the link or suspending the TWT session.

5. The method of claim 1, further comprising:
   receiving, by the first multi-link device, another status change information of the link in the multi-link communications system for the first multi-link device from the disabled status to the enabled status;
   receiving, by the first multi-link device, a particular frame from the second multi-link device in the multi-link communications system that includes critical information to allow the first multi-link device to access the link in the enabled status; and
   after reception of the particular frame, accessing the link by the first multi-link device after receiving the particular frame from the second multi-link device.

6. The method of claim 5,
   wherein the particular frame is a beacon frame or a probe response frame that includes capabilities or operating parameters of the second multi-link device on the link.

7. The method of claim 6, further comprising
   receiving, by the first multi-link device, a frame from the second multi-link device that indicates a critical update has occurred on the link while the link was disabled.

8. The method of claim 1:
   wherein the temporal field of the information element in the frame includes a countdown value or a time value that indicates the remaining time before the link will be disabled.

9. The method of claim 1:
   wherein the frame with the information element is transmitted on the link or on another link associated with the second multi-link device.

10. A multi-link communications system comprising:
    a first multi-link device;
    a second multi-link device; and
    at least one link associated with the first and second multi-link devices;
    wherein the first multi-link device comprises:
      a processor configured to:
      receive a status change information of a link in the multi-link communications system for the first multi-link device from an enabled status to a disabled status; and
      in response to the status change information, at least partially reset parameters related to per-link operations for the link;
    wherein the second multi-link device includes a second processor configured to,
      announce an upcoming disablement of the link using a frame with an information element that includes a temporal field indicating remaining time before the link will be disabled; and
      disable the link after the remaining time indicated by the temporal field of the information element in the frame has elapsed.

11. The multi-link communications system of claim 10:
    wherein the processor of the first multi-link device is configured to:
      receive another status change information of the link in the multi-link communications system for the first multi-link device from the disabled status to the enabled status;
      receive a particular frame from the second multi-link device in the multi-link communications system that includes critical information to allow the first multi-link device to access the link in the enabled status; and
      access the link after receiving the particular frame from the second multi-link device.

12. The multi-link communications system of claim 10:
wherein the temporal field of the information element in the frame includes a countdown value or a time value that indicates the remaining time before the link will be disabled.

13. The multi-link communications system of claim 10:
wherein the frame with the information element is transmitted on the link or on another link associated with the second multi-link device.

14. A multi-link device of a multi-link communications system, the multi-link device comprising:
a processor configured to:
receive a status change information of a link in the multi-link communications system for the multi-link device from an enabled status to a disabled status;
in response to the status change information, at least partially reset parameters related to per-link operations for the link;
receive an announcement, by a second multi-link device in the multi-link communications system, of an upcoming disablement of the link using a frame with an information element that includes a temporal field indicating remaining time before the link will be disabled, and that the link will be disabled, by the second multi-link device, after the remaining time indicated by the temporal field of the information element in the frame has elapsed.

15. The multi-link device of claim 14:
wherein the parameters include operating modes on the link, enhanced distributed channel access function (EDCAF) values and states, parameters related to target wake time (TWT), or parameters related to association identifier (AID).

16. The multi-link device of claim 14:
wherein the processor is configured to:
receive another status change information of the link in the multi-link communications system for the multi-link device from the disabled status to the enabled status;
receive a particular frame from the second multi-link device in the multi-link communications system that includes critical information to allow the multi-link device to access the link in the enabled status; and
access the link after receiving the particular frame from the second multi-link device.

17. The multi-link device of claim 16:
wherein the particular frame is a beacon frame or a probe response frame that includes capabilities or operating parameters of the second multi-link device on the link.

18. The multi-link device of claim 16:
wherein the processor is configured to receive a frame from the second multi-link device that indicates a critical update has occurred on the link while the link was disabled.

* * * * *